(12) United States Patent
Hall

(10) Patent No.: US 7,765,170 B2
(45) Date of Patent: Jul. 27, 2010

(54) DATA SEGMENTATION ALGORITHM USING A DECREMENTING SLIDING WALKER CHUNKING APPROACH

(75) Inventor: Michael David Hall, Carrollton, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 11/456,615

(22) Filed: Jul. 11, 2006

(65) Prior Publication Data

US 2008/0016060 A1    Jan. 17, 2008

(51) Int. Cl.
*G06F 15/18* (2006.01)
*G06F 7/00* (2006.01)

(52) U.S. Cl. .................................. 706/1; 382/177
(58) Field of Classification Search .................. 706/1
See application file for complete search history.

(56) References Cited

U.S. PATENT DOCUMENTS 6,229,536 B1 *   5/2001   Alexander et al. .......... 345/440.1
2003/0195429 A1 * 10/2003   Wilson ....................... 600/544

* cited by examiner

*Primary Examiner*—Donald Sparks
*Assistant Examiner*—Nathan H Brown, Jr.

(57) ABSTRACT

A method for segmenting a data set is disclosed. The method consists of setting a maximum walker size and setting a walker size. Then, a first segment of data from the data set is obtained, wherein the first segment of data is the size of the walker. Then, a second segment of data from the data set is obtained, wherein the second segment of data is not greater than the maximum walker size.

20 Claims, 3 Drawing Sheets

| | 1 | 2 | 3 | 4 | 5 | 6 | 7 | 8 | 9 | 10 |
|---|---|---|---|---|---|---|---|---|---|---|
| 1 | 4 | 9 | z | 6 | w | 9 | 4 | 2 | 5 | z |
| 2 | 4 | 9 | z | 6 | w | 9 | 4 | 2 | 5 | z |
| 3 | 4 | 9 | z | 6 | w | 9 | 4 | 2 | 5 | z |
| 4 | 4 | 9 | z | 6 | w | 9 | 4 | 2 | 5 | z |
| 5 | 4 | 9 | z | 6 | w | 9 | 4 | 2 | 5 | z |
| 6 | 4 | 9 | z | 6 | w | 9 | 4 | 2 | 5 | z |
| 7 | 4 | 9 | z | 6 | w | 9 | 4 | 2 | 5 | z |
| 8 | 4 | 9 | z | 6 | w | 9 | 4 | 2 | 5 | z |
| 9 | 4 | 9 | z | 6 | w | 9 | 4 | 2 | 5 | z |
| 10 | 4 | 9 | z | 6 | w | 9 | 4 | 2 | 5 | z |
| 11 | 4 | 9 | z | 6 | w | 9 | 4 | 2 | 5 | z |
| 12 | 4 | 9 | z | 6 | w | 9 | 4 | 2 | 5 | z |
| 13 | 4 | 9 | z | 6 | w | 9 | 4 | 2 | 5 | z |
| 14 | 4 | 9 | z | 6 | w | 9 | 4 | 2 | 5 | z |
| 15 | 4 | 9 | z | 6 | w | 9 | 4 | 2 | 5 | z |
| 16 | 4 | 9 | z | 6 | w | 9 | 4 | 2 | 5 | z |
| 17 | 4 | 9 | z | 6 | w | 9 | 4 | 2 | 5 | z |
| 18 | 4 | 9 | z | 6 | w | 9 | 4 | 2 | 5 | z |
| 19 | 4 | 9 | z | 6 | w | 9 | 4 | 2 | 5 | z |
| 20 | 4 | 9 | z | 6 | w | 9 | 4 | 2 | 5 | z |
| 21 | 4 | 9 | z | 6 | w | 9 | 4 | 2 | 5 | z |
| 22 | 4 | 9 | z | 6 | w | 9 | 4 | 2 | 5 | z |
| 23 | 4 | 9 | z | 6 | w | 9 | 4 | 2 | 5 | z |
| 24 | 4 | 9 | z | 6 | w | 9 | 4 | 2 | 5 | z |
| 25 | 4 | 9 | z | 6 | w | 9 | 4 | 2 | 5 | z |
| 26 | 4 | 9 | z | 6 | w | 9 | 4 | 2 | 5 | z |
| 27 | 4 | 9 | z | 6 | w | 9 | 4 | 2 | 5 | z |
| 28 | 4 | 9 | z | 6 | w | 9 | 4 | 2 | 5 | z |
| 29 | 4 | 9 | z | 6 | w | 9 | 4 | 2 | 5 | z |
| 30 | 4 | 9 | z | 6 | w | 9 | 4 | 2 | 5 | z |
| 31 | 4 | 9 | z | 6 | w | 9 | 4 | 2 | 5 | z |
| 32 | 4 | 9 | z | 6 | w | 9 | 4 | 2 | 5 | z |
| 33 | 4 | 9 | z | 6 | w | 9 | 4 | 2 | 5 | z |
| 34 | 4 | 9 | z | 6 | w | 9 | 4 | 2 | 5 | z |
| 35 | 4 | 9 | z | 6 | w | 9 | 4 | 2 | 5 | z |
| 36 | 4 | 9 | z | 6 | w | 9 | 4 | 2 | 5 | z |
| 37 | 4 | 9 | z | 6 | w | 9 | 4 | 2 | 5 | z |
| 38 | 4 | 9 | z | 6 | w | 9 | 4 | 2 | 5 | z |
| 39 | 4 | 9 | z | 6 | w | 9 | 4 | 2 | 5 | z |
| 40 | 4 | 9 | z | 6 | w | 9 | 4 | 2 | 5 | z |

Figure 1

DATA SEGMENTATION ALGORITHM USING A DECREMENTING SLIDING WALKER CHUNKING APPROACH

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD

The present disclosure is directed to automated pattern recognition, and more particularly, but not by way of limitation, to a system and method for dividing a string of data into segments that can be examined for patterns.

BACKGROUND

Intelligence engines and similar data analysis toots have been used in applications such as ubiquitous networks; smart homes; handset personalization; image recognition; visual security; biometrics; intelligent and proactive operations, administration, and management (OAM); cognitive radio spectrum management;: context-aware mobility management; gesture recognition; social networks; prediction of user preferences and actions; and other applications. An intelligence engine typically receives data related to various events and attempts to detect patterns in the data. From the patterns, the intelligence engine can learn about the environment in which the events occurred and can predict near-term future events based on the learned information. The intelligence engine might then cause actions to be taken based on the predictions.

A pattern might be a sequence of characters that occurs more than once in a set of data. For example, if the character string 'ABC' appeared several times in a data set,. 'ABC' might be considered a pattern. A repeated, contiguous string of characters in a fixed order such as this might be referred to as a tight pattern. Characters that appear in conjunction with one another more than once in a data set, but that are not contiguous or are not in a fixed sequence might be considered a loose pattern. For example, the string '6w9' and the string '96w' might be a loose pattern. The string 'ABC' and the string 'ABxxC' might also be a loose pattern. An intelligence engine would typically attempt to detect both tight and loose patterns.

One of the challenges for an intelligence engine is that the amount of historical data to be examined for patterns might be very large. For example, in a network OAM scenario, a great deal of information such as alarms, operational metrics, threshold crossing events, and operator commands may be sent to an intelligence engine for analysis. The data set could contain millions of characters, each representing a different event in the network. For instance, one character might mean that an alarm has been received about a network element that has malfunctioned. Another character might mean that a performance threshold on a network element has been crossed. Yet another character might mean that an operator has issued a command to hot swap a circuit board. The intelligence engine needs to understand these characters, find patterns among the characters, and determine if future events can be predicted from the patterns.

In attempting to identify patterns in a data set, an intelligence engine might divide the data into segments, where a segment is defined as a set of contiguous data items. Each segment might then be compared to other segments through a mathematical operation such as set intersection to determine whether any data strings are present in multiple segments. One technique for segmenting a data set uses a concept known as a fixed-size walker, where a walker might be defined as a structure superimposed on a data set in order to define a segment of data that is to be used as the basis for further segmentation of the data set.

In the fixed-size walker technique, a walker of a constant size is used to divide a data set into contiguous, fixed-sized segments. For example, a data set may consist of 15 characters, and a fixed walker size of five characters might be used to segment the data set. The five-character walker might be placed across the first five characters to create a first data segment. The walker might then be moved to the sixth through tenth characters to create a second data segment and to the eleventh through fifteenth characters to create a third data segment. The data set would thus be divided into three contiguous five-character segments. Set intersection or a similar mathematical operation could then be performed on the three segments to find any commonalities between the segments and the commonalities could be considered a recurring pattern.

The fixed-size walker technique can miss patterns that span a boundary between segments. For example, in the fifteen-character data set mentioned above, the string 'ABC' might appear as the first three characters and might appear again as the tenth, eleventh, and twelfth characters. Two instances of the same string such as this would typically constitute a pattern. If a fixed walker size of five were used to divide the data into three segments, the first 'ABC' string would be placed in the first segment, but the 'A' of the second 'ABC' string would be placed in the second segment and the 'BC' of the second 'ABC' string would be placed in the third segment. A comparison of the first, second, and third segments would not reveal that 'ABC' appears twice in the data set.

SUMMARY

In one embodiment, a method for segmenting a data set is provided. The method consists of setting a maximum walker size and setting a walker size. Then, a first segment of data from the data set is obtained, wherein the first segment of data is the size of the walker. Then, a second segment of data from the data set is obtained, wherein the second segment of data is not greater than the maximum walker size.

In another embodiment, an alternative method for segmenting a data set is provided. The method consists of setting a maximum walker size; setting a walker size; setting a walk offset to zero; creating a first segment of data of the walker size at the walk offset from the data set; from a portion of the data set remaining after the creation of the walker size segment, creating a maximum number of contiguous segments of data of maximum walker size; and, if the creation of the maximum number of contiguous segments of maximum walker size leaves additional data, grouping the additional data into a minimum number of remaining segments.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is a diagram of a segmentation of data according to an embodiment of the disclosure.

DETAILED DESCRIPTION

Figure 2:
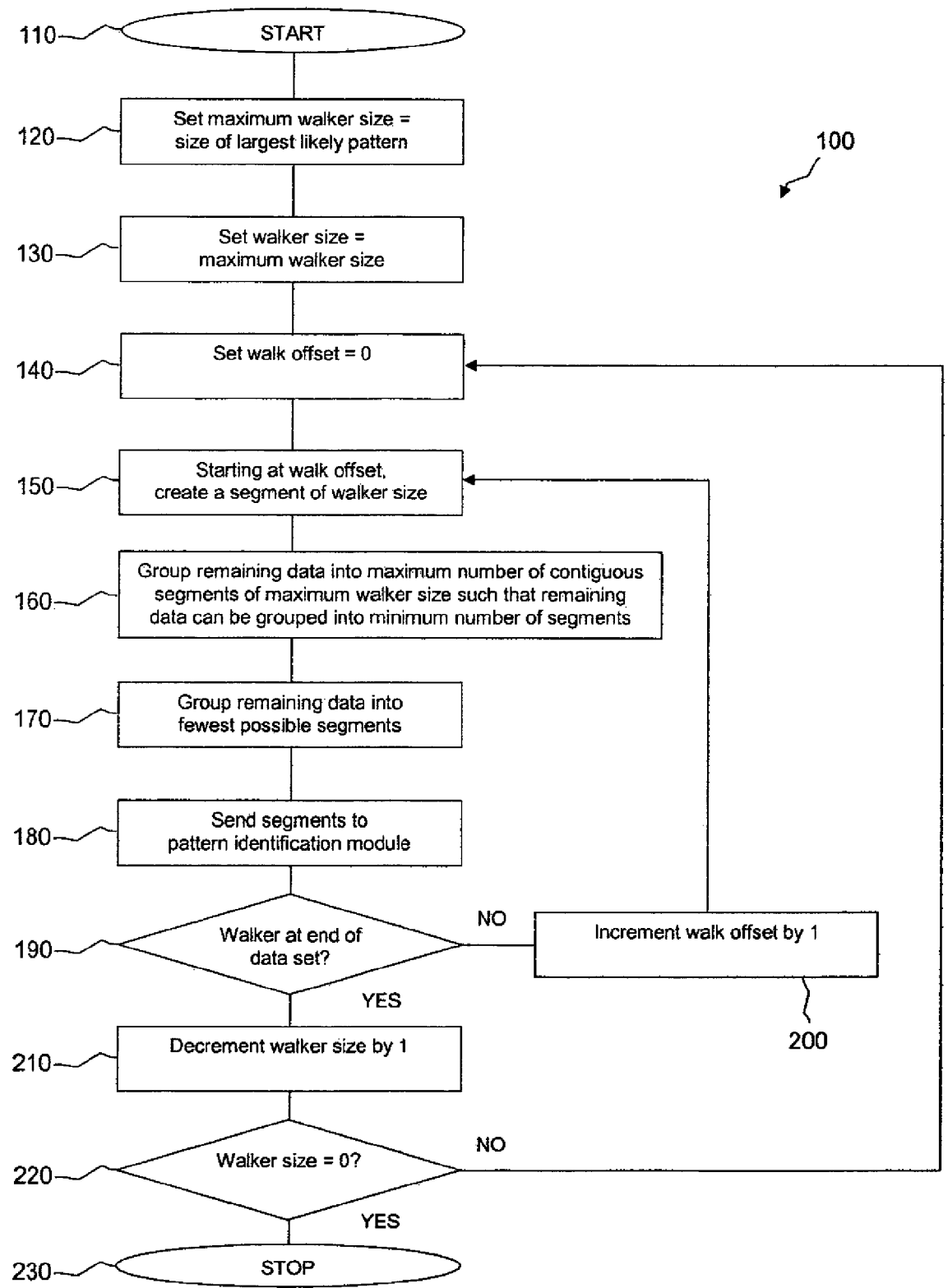
FIG. 2 is a diagram of a method for segmenting data according to an embodiment of the disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Embodiments of the present disclosure provide a method for segmenting a data set in such a manner that patterns in the data set are highly likely to be found. A decrementing, sliding walker is used to divide the data set into segments of all possible sizes and all possible contents. The segments can then be passed to a previously existing pattern identification module to determine whether any strings within the segments occur in multiple locations in the data set. In this way, if the pattern identification module is functioning properly, all patterns present in the data set can be found.

FIG. 1 illustrates a segmentation of a sample data set according to an embodiment of the present disclosure. In this example, the data set to be segmented consists of the character string '49z6w9425z'. Each character in the string might represent a different event and it might be desired to determine if any patterns exist in the events by determining if any patterns are present in the character string. For example, each character might represent an event that occurs in an intelligent operations, administration, and management (OAM) application for a telecommunications or computer network; in an image recognition application; in a biometrics application; in a cognitive radio spectrum management application; or in another application. Events might include alarms, performance threshold crossing alerts, operator commands, and similar occurrences.

While the data set is depicted in FIG. 1 as a table with ten columns and 40 rows, it should be understood that the actual data set contains only ten characters. Each row in the table is intended to: depict a different pass of the decrementing, sliding walker through the same data set.

In an embodiment, a first step in the segmentation of the data set is to set a maximum size for the walker to be used in the segmentation procedure. The maximum walker size would typically be equal to the size of the largest pattern expected to be found in the data set Since the largest possible pattern in any data set occurs when there are commonalities between the entire first half of the data set and the entire second half of the data set, the largest possible pattern has a size equal to half the size of the entire data set. For maximum possible thoroughness, then, the decrementing, sliding walker technique might use a maximum walker size equal to half the size of the data set being segmented.

Alternatively, if the largest pattern expected to be found in a data set is less than half the size of the data set, the maximum walker size might be set to the size of the largest expected pattern. For example, if the longest string that is likely to be repeated within a data set is three characters long, the maximum walker size might be set to three. Setting the maximum walker size less than half the size of the data set can decrease the amount of analysis that needs to be done on the data set, but risks missing patterns larger than the selected maximum walker size.

In the embodiment of FIG. 1, a maximum walker size equal to half the size of the data set has been selected. That is, for the data set of ten characters, a maximum walker size of five characters was chosen. The initial size of the walker to be used in segmenting the data set was then set to the maximum walker size and the walker was placed across the data set starting at the leftmost position in the data set This is depicted in row I where the characters in columns 1 through 5 have been shaded to indicate that the walker has been placed across those characters. The characters covered by the walker (those in columns 1 through 5) are placed in a first segment of data and the remaining characters in the data set (those in columns 6 through 10) are placed in a second data segment. The two data segments might then be sent to a pattern identification module to determine if the segments have any character strings in common.

The walker then makes another pass through the data set, as depicted in row 2. In this case, the starting position of the walker is shifted one character to the right so that the walker covers the characters in columns 2 through 6. This sliding of the walker by one position might be described as setting a walk offset for the walker at a value of one. The single character in column 1 is placed in a data segment, the five characters covered by the walker are placed in a data segment, and the characters in columns 7 through 10 are placed in a data segment. The three data segments are then sent to the pattern identification module.

Similar procedures are followed for rows 3 through 6. That is, the walk offset is set to two, three, four, and five, respectively, for each of these rows. The walker is then placed over the characters immediately past the walk offset. This creates segments of size two, five, and three in row 3; three, five, and two in row 4; four, five, and one in row 5; and five and five in row 6. As each row is processed, these data segments are sent to the pattern identification module.

It can be seen that the walker has reached the end of the data set in row 6 since the rightmost portion of the walker coincides with the rightmost portion of the data set. When this occurs, the size of the walker is decremented by one and the walk offset is reset to zero. This is depicted in row 7, where the walker has a size of four and has returned to the beginning of the data set. That is, the leftmost portion of the walker coincides with the leftmost portion of the data set and the walker covers the characters in columns 1 through 4. The remaining data in the data set consists of the six characters in columns 5 through 10.

In an embodiment, segments larger than the maximum walker size are not used for the data remaining after a walker has been placed on a data set. Instead, the remaining data is placed into as many contiguous segments as possible that are as large as the maximum walker size. As an additional constraint, any additional data still present after the remaining data has been placed into contiguous segments the same size as the maximum walker size might be placed into the fewest possible segments. This additional constraint is not applicable to the examples currently under consideration but becomes relevant as the walker size decreases.

The segmentation of the remaining data can be illustrated in row 7, where the walker creates a segment consisting of the four characters in columns I through 4. The remaining data in columns 5 through 10 is divided into a segment of length five (the maximum walker size) contiguous to the walker such that the characters in columns 5 through 9 make up another segment. The data remaining after the maximum walker sized segment is created, that is, the character in column 10, is placed in yet another segment. The segments that are created in this manner are then sent to the pattern identification module.

The walk offset is then incremented and the walker makes another pass through the data set, as shown in row 8. In this case, data segments of size one, four, and five are created. Similar considerations apply to rows 9 through 12. When row 13 is reached, the walker covers the characters in columns 7 through 10 and the remaining data is in columns 1 through 6. Again applying the rule that the remaining data should not be placed in a segment larger than the maximum walker size, the remaining data in columns 1 through 5 is placed in a segment and the data in column 6 is placed in another segment.

It will be observed that, in row 13, the remaining data in columns I through 6 could be segmented such that the data in columns 2 through 6 is placed in one segment and the data in column 1 is placed in another segment. Either method of segmenting the remaining data will provide satisfactory results as long as the same method is applied consistently throughout all passes of the walker through the data set. For the sake of consistency in the current example, an additional constraint may be added stating that when the size of the remaining data to the left of the walker is greater than the maximum walker size, a maximum walker sized segment should be created starting at the leftmost portion of the data set. In other embodiments, a similar constraint might state that a maximum walker sized segment should be created starting at the rightmost point in the remaining data.

Since the walker has again reached the end of the data set in row 13, the size of the walker is again decremented and the walk offset is again reset to zero. This is shown in row 14, where columns 1 through 3 are covered by the walker and make up a data segment. Columns 4 through 8 make up another data segment (a segment of maximum walker size) and columns 9 and 10 make up another data segment. The walker continues to slide to the right, the data in the data set continues to be segmented and the segments continue to be sent to the pattern identification module as described above. When the walker reaches the end of the data set, the walker size is decremented, the walk offset is reset to zero, and the process is repeated as described above. When the walker size reaches zero, the decrementing, sliding walker segmentation technique can be considered complete.

While the above description has focused on a walker that moves from left to right through a data set, it should be clear that similar results would be achieved if the walker moved from right to left. That is, the walk offset can be considered a distance from either end of the data set. Similarly, while the size of the walker was described as decreasing from a maximum down to one, the size of the walker could also increase from one or some other minimum up to a maximum. Also, the distance that the walker slides on each pass through a data set could be greater than one and the change in size of the walker upon reaching the end of a data set could be greater than one. However, a walk offset greater than one or a change in the size of the walker greater than one could cause patterns to be missed.

FIG. 2 is a flowchart of an embodiment of a method for segmenting a data set using the decrementing, sliding walker technique. The method 100 starts at box 110. In box 120, a maximum walker size is set to the size of the largest pattern likely to be found in the data set. For greatest thoroughness, the maximum walker size might be set to half the size of the data set. Setting the maximum walker size less than half the size of the data set might reduce the number of steps in the procedure but could cause some patterns to be missed.

In box 130, the size of a walker is set to the maximum walker size. This is applies to a case where the walker size is decreased from a maximum to a minimum. In a case where the walker size is increased from one or some other minimum to the maximum walker size, the size of the walker would be set to the minimum in box 130. In box 140, the walk offset is set to zero. That is, the distance from the end of the data set at which the walker will be placed is set to zero. In box 150, a data segment with a size equal to the walker size is created starting at the walk offset. Since the walk offset is zero in the first loop through the method 100, the data segment is created at one of the ends of the data set.

In box 160, the data remaining after the creation of the walker-sized segment is grouped into segments. Starting at a walk offset of zero and moving in the same direction that the walker slides, the remaining data is placed into segments of maximum walker size, if possible. As many segments as possible are created that have the maximum walker size and that are contiguous with one another.

For example, if the walker is sliding from left to right through a data set, any remaining data to the left of the walker-sized segment is examined to determine if any maximum walker sized segments can be created from this remaining data. If the size of this remaining data is equal to or greater than the maximum walker size, a maximum walker sized segment is created starting at a walk offset of zero. If another maximum walker sized segment can be created contiguous to the previously created maximum walker sized segment such a segment is created. The creation of contiguous, maximum walker sized segments continues for the rest of the remaining data to the left of the walker-sized segment until the leftmost portion of the walker-sized segment is reached or until the size of the data to the left of the maximum walker sized segment is smaller than the maximum walker size.

Then, any remaining data to the right of the walker-sized segment is examined and a procedure similar to that described immediately above is followed That is, if the size of the remaining data to the right of the walker-sized segment is equal to or greater than the maximum walker size, a maximum walker sized segment is created starting at the rightmost portion of the walker-sized segment If another maximum walker sized segment can be created contiguous to the previously created maximum walker sized segment, such a segment is created. The creation of contiguous, maximum walker sized segments continues for the rest of the remaining data to the right of the walker-sized segment until the rightmost portion of the entire data set is reached or until the size of the data to the right of the maximum walker sized segment is smaller than the maximum walker size.

When the walker-sized segment and the maximum number of contiguous maximum walker sized segments are created in this manner, a minimum number of data items non-contiguous with other data items will remain. In box 170, these remaining data items are grouped into the smallest possible number of segments. For example, if two contiguous data items remained, they would be grouped into a single two-item segment rather than two one-item segments.

In box 180, the segments that were created in boxes 150, 160, and 170 are sent to a pattern identification module. In other embodiments, the segments might be sent to the pattern identification module at different times. For example, the segments created by multiple passes of the walker through the data set might be stored temporarily and multiple segments might be sent to the pattern identification module simultaneously.

In box 190, a decision is made based on whether the walker has reached the end of the data set. That is, it is determined whether the size of the walk offset plus the size of the walker is equal to the size of the entire data set. If the walker has not reached the end of the data set, the method 100 moves to box 200, where the walk offset is incremented by one. In other embodiments, the walk offset could be incremented by other amounts, but a walk offset increment greater than one could cause patterns to be missed. The method 100 then returns to box 150 and the actions described in boxes 150, 160, 170, 180, and 190 are repeated.

If, in box 190, it is determined that the walker has reached the end of the data set, the method 100 moves to box 210, where the walker size is decremented by one. In the case where the walker size was originally set to a minimum in box 130, the walker size would be incremented by one in box 210. In other embodiments, the walker size could be changed by other amounts, but a walker size increment or decrement greater than one could cause patterns to be missed.

In box 220, it is determined whether the walker size equals zero. Alternatively, in the case where the walker size was originally set to a minimum in box 130 and where the walker size is incremented in box 210, box 220 would determine whether the walker size had reached the maximum walker size. If the walker size does not equal zero (or, alternatively, does not equal the maximum walker size), the method 100 returns to box 140 and the actions described in boxes 140, 150, 160, 170, 180, 190, 200, 210, and 220 are repeated. If the walker size does equal zero, the method 100 ends at box 230.

An example may clarify the operation of the method 100 in the case where the maximum walker size is less than half the size of the entire data set. If the largest pattern likely to be found in the data set is three, the maximum walker size would be set to three in box 120 of FIG. 2. The walker size would then be set to three in box 130 and the walk offset would be set to zero in box 140.

If the data table in FIG. 1 is used to illustrate this example, the method 100 would start at row 14 since the walker passes depicted in rows 1 through 13 include walker sizes of four and five. While this would eliminate the need to perform the walker passes depicted in rows 1 through 13, this could cause patterns of size four or five to be missed.

Following the instructions of box 150, a segment of size three is created at a walk offset of zero in row 14. This is depicted by the shaded data in columns I through 3 of row 14. Next, according to box 160, the remaining data in row 14 is grouped into the largest possible number of contiguous segments with a size of three. This could be done in several different ways, but in this example the grouping will begin at the leftmost point in the remaining data, that is, in column 4. The data in columns 4 through 6 is grouped into a segment and the data in columns 7 through 9 is grouped into a segment.

The size of the data remaining at this point is less than three, so the method 100 moves to box 170, where the remaining data is grouped into the fewest possible segments. In this case, the data in column 10 is the only item remaining, so that data item is considered a segment. In box 180, the segment consisting of the data in columns 1 through 3, the segment consisting of the data in columns 4 through 6, the segment consisting of the data in columns 7 through 9, and the segment consisting of the data in column 10 are sent to the pattern identification module.

In box 190, it is determined that the walker is not at the end of the data set, so the walk offset is increased to one in box 200. The method 100 then returns to box 150, where a segment of size three is created at the walk offset. This is depicted in row 15, where the shaded data in columns 2 through 4 comprises the data segment and the unshaded data in column 1 indicates the size of the walk offset.

When the instructions of box 160 are followed, it is found that the size of remaining data to the left of the walker-sized segment is less than three and therefore a maximum walker sized segment cannot be created from this remaining data. The remaining data to the right of the walker-sized segment is examined and it is found that maximum walker sized segments can be created from the data in columns 5 through 7 and 8 through 10. Segments are created from the data in these columns and then the instructions of box 170 are followed. That is, another segment is created containing the data in column 1. The segments just created are then sent to the pattern identification module in box 180.

In box 190, it is determined that the walker is not at the end of the data set, so the walk offset is increased to two in box 200. Another grouping of segments following the rules of boxes 150, 160, and 170 is then performed. This can be depicted by row 16, where the data in columns 3 through 5 would make up the walker-sized segment and the data in columns 6 through 8 would make up a maximum walker sized segment that can be created from the remaining data. Grouping the data remaining at this point into the smallest number of groups would cause the data in columns 1 and 2 to be placed into a segment and the data in columns 9 and 10 to be placed in a segment.

Similar procedures would be followed for rows 17 through 21. In row 17, the segments would be made up of the data in columns 1 through 3, 4 through 6, 7 through 9, and 10. In row 18, the segments would be made up of the data in columns 1 through 3, column 4, columns 5 through 7, and columns 8 through 10. In row 19, the segments would be made up of the data in columns 1 through 3, 4 through 5, 6 through 8, and 9 through 10. In row 20, the segments would be made up of the data in columns 1 through 3, 4 through 6, 7 through 9, and 10. In row 21, the segments would be made up of the data in columns 1 through 3, 4 through 6, 7, and 8 through 10.

At this point, it would be determined, in box 190, that the walker is at the end of the data set. The method 100 would then move to box 210, where size of the walker would be decreased from three to two. It would be determined in box 220 that the walker size is not zero, so the method 100 would return to box 140, where the walk offset is reset to zero. A walker of size two would then begin making passes through the data set as depicted in rows 22 through 30. On each pass, a data segment corresponding to the size and position of the walker would first be taken. Then, as many contiguous segments as possible would be taken that have a size of three and that leave as few non-contiguous data items as possible. Then, the remaining data would be grouped into as few segments as possible.

The walker pass depicted on row 27 can illustrate how this data segmentation might occur. The size-two walker creates a data segment from the data in columns 6 and 7. Then, the data in columns 1 through 3 is placed in a maximum walker sized segment and the data in columns 8 through 10 is placed in a maximum walker sized segment. This grouping can be contrasted with a grouping in which the data in columns 2 through 4 is placed in a segment instead of the data in columns 1 through 3 being placed in a segment. While both groupings would create the maximum number of segments with the maximum walker size (as specified in box 160), grouping the items in columns 2 through 4 would leave two non-contiguous data items, namely the items in columns 1 and 5. These items would be grouped into two different segments. Grouping the items in columns 1 through 3 would leave only the contiguous data in columns 4 and 5, which could be placed in a single segment. Thus, the latter grouping would allow the remaining data to be grouped into the fewest possible segments, as further specified in box 160.

When the walker again reaches the end of the data set, as shown in row 30, the walker size is decreased from two to one and the one-sized walker passes through the data set, as shown in rows 31 through 40. Data segments are created as described above until the walker again reaches the end of the data set. At this point, the walker size is decremented to zero and the method 100 ends.

It will be observed that some duplication of segment sequences may occur with this method. For example, returning to the example where a maximum walker size of five is used for the data in FIG. 1, row 5 contains a segment of length four, followed by a segment of length five, followed by a segment of length one. Row 7 also contains the same segment of length four, followed by the same segment of length five, followed by the same segment of length one. While the walker covers columns 5 through 9 in row 5 and covers columns 1 through 4 in row 7, the sequence of four/five/one for the segment lengths is identical in both cases. A pattern identification module would be likely to treat each case in an identical manner.

In an embodiment, the decrementing, sliding walker technique can be modified so that such repeated sequences are processed only once. While ignoring duplicates may reduce the amount of segmentation done on a data set, the reduction in processing time may be offset by the time needed to identify duplicate sequences. The decrementing, sliding walker technique would typically be employed during a learning or training phase for an intelligence engine, rather than at run time. Processing time is typically not a highly relevant consideration during a learning or training phase and therefore the elimination of duplicate sequences may not provide a benefit that justifies the effort needed to implement it.

Figure 3:
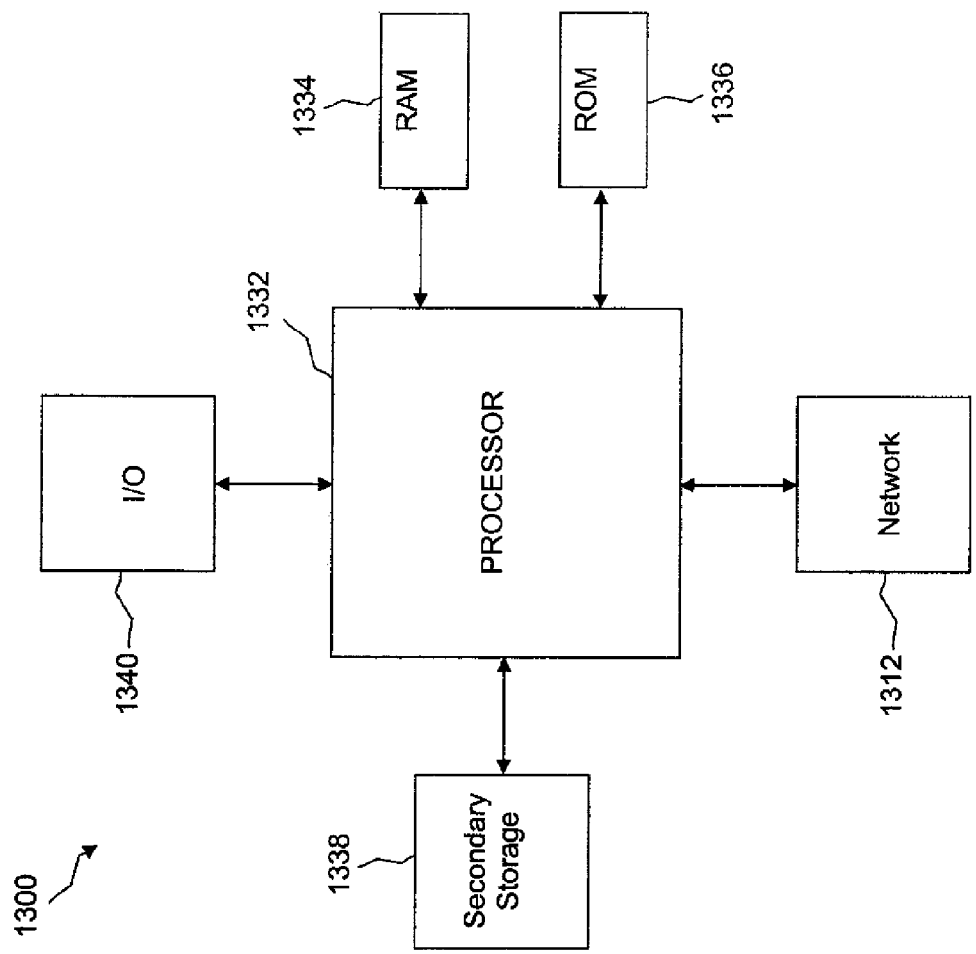
FIG. 3 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is an non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary Storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method, comprising:

obtaining a data set, wherein the data set includes data derived from at least one of an intelligent operations, administration, and management (OAM) application for a telecommunications network, an intelligent operations, administration, and management (OAM) application for a computer network, an image recognition application; a biometrics application, and a cognitive radio spectrum management application;

setting a maximum walker size using a processor;

setting a walker size using the processor;

obtaining a first segment of data from the data set corresponding to the size of the walker; and obtaining a second segment of data from the data set that is not greater than the maximum walker size; and outputting the first and second segment of data to a computer readable medium.

2. The method of claim 1, further comprising adjusting the size of the walker, and after adjusting the size of the walker:

obtaining a third segment of data from the data set, the third segment of data the adjusted walker size, and obtaining a fourth segment of data from the data set, the fourth segment of data not greater than the maximum walker size, the first and third segments of data being at least partially different segments of data, and the second and fourth segments of data being at least partially different segments of data.

3. The method of claim 2, further comprising:

analyzing the first and second segments of data for a pattern; and analyzing the second and third segments of data for a pattern.

4. The method of claim 2, further comprising:

comparing the first segment of data with the second segment of data for a pattern; and comparing the third segment of data with the fourth segment of data for a pattern.

5. The method of claim 1, wherein the maximum walker size is not more than half the length of the data set.

6. The method of claim 1, wherein the maximum walker size is substantially about half the length of the data set.

7. The method of claim 1, further comprising when additional data remains after obtaining the first and second segments of data, obtaining when available additional data segments not greater than the maximum walker size, and when data segments not greater than the maximum walker size are not available then obtaining the remaining data into a remaining segment.

8. The method of claim 1, further comprising when additional data remains after obtaining the first and second segments of data, obtaining when available additional data segments not greater than the maximum walker size, and when data segments not greater than the maximum walker size are not available then obtaining the remaining data into a minimum number of remaining segments.

9. The method of claim 1, further comprising:

analyzing the first and second segments of data;

moving the walker to obtain a third segment of data from the data set, the third segment of data the adjusted walker size;

obtaining a fourth segment of data from the data set, the fourth segment of data not greater than the maximum walker size, the first and third segments of data being at least partially different segments of data, and the second and fourth segments of data being at least partially different segments of data; and analyzing the third and fourth segments of data.

10. The method of claim 9, further comprising one of increasing or decreasing the size of the walker.

11. A method for segmenting a data set, comprising:

setting a maximum walker size;

setting a walker size;

setting walk offset to zero;

creating a first segment of data of the walker size at the walker offset from the data set;

from a portion of the data set remaining after the creation of the walker size segment, creating a maximum number of contiguous segments of data of maximum walker size; and if the ration of the maximum number of continuous segments of maximum walker size leaves additional data, grouping the additional data into a minimum number of remaining segments; and outputting at least one segment of data to a computer readable medium wherein the data set includes data derived from at least one of:

an intelligent operations, administration, and management (O.AM) application for a telecommunications network;

an intelligent operations, administration, and management (OAM) application for a computer network;

an image recognition application; a biometrics application; and a cognitive radio spectrum management application.

12. The method of claim 11, further comprising after the grouping of the additional data of less than the maximum walker size, determining whether the walker is at an end of the data set.

13. The method of claim 12, further comprising, when the walker is not at the end of the data set:

incrementing the walk offset by one; and using the incremented walk offset, repeating the creating of the first segment, creating a maximum number of contiguous segments, grouping the additional data into a minimum number of remaining segments.

14. The method of claim 12, further comprising, when the walker is at the end of the data set, decrementing the walker size by one and determining whether the walker size equals zero.

15. The method of claim 14, further comprising, when the walker size does not equal zero:

setting the walk offset to zero;

creating a next segment of data of walker size at the walk offset in the data set;

from the data set remaining after the creation of the next segment of data of the walker size, creating the maximum number of contiguous segments of maximum walker size;

if the creation of the maximum number of contiguous segments of maximum walker size leaves additional data, grouping the additional data into a minimum number of remaining segments.

16. The method of claim 14, further comprising, when the walker size does equal zero, stopping.

17. The method of claim 14, wherein the first and contiguous segments are sent to a pattern identification module.

18. The method of claim 14, wherein the maximum walker size is set equal to one half a size of the data set.

19. The method of claim 14, wherein the maximum walker size is set equal to a size of a largest pattern likely to be found in the data set.

20. The method of claim 12, further comprising, when the walker is not at the end of the data set:
- incrementing the walk offset by one; and
- using the incremented walk offset, repeating the creating of the first segment and creating a maximum number of contiguous segments.

* * * * *